United States Patent [19]

Shigeta et al.

[11] Patent Number: 4,522,895

[45] Date of Patent: Jun. 11, 1985

[54] MULTILAYER FUEL CELL ELECTRODE SUBSTRATE HAVING ELONGATED HOLES FOR FEEDING REACTANT GASES

[75] Inventors: Masatomo Shigeta; Hiroyuki Fukuda; Kuniyuki Saitoh; Hisatsugu Kaji, all of Iwaki, Japan

[73] Assignee: Kureha Kagaku Kogyo Kabushiki Kaisha, Tokyo, Japan

[21] Appl. No.: 535,913

[22] Filed: Sep. 26, 1983

[30] Foreign Application Priority Data

Oct. 5, 1982 [JP] Japan .................................. 57-174960
Oct. 12, 1982 [JP] Japan .................................. 57-178770
Nov. 24, 1982 [JP] Japan .................................. 57-205628

[51] Int. Cl.³ .............................................. H01M 4/96
[52] U.S. Cl. ........................................ 429/44; 429/34; 429/72; 429/209
[58] Field of Search .......................... 429/40–45, 429/34, 38–39, 209, 210, 72

[56] References Cited

U.S. PATENT DOCUMENTS

| | | | |
|---|---|---|---|
| 2,860,175 | 11/1958 | Justi | 429/45 |
| 3,284,243 | 11/1966 | Von Sturm | 429/40 |
| 3,342,643 | 9/1967 | Le Bihan | 429/45 |
| 3,511,714 | 5/1970 | Bocciarelli | 429/34 |
| 3,578,502 | 5/1971 | Tannenberger et al. | 429/44 |
| 4,035,551 | 7/1977 | Grevstad | 429/41 X |
| 4,115,627 | 9/1978 | Christner | 429/44 |
| 4,292,379 | 9/1981 | Kothmann | 429/34 X |

*Primary Examiner*—Anthony Skapars
*Attorney, Agent, or Firm*—Oblon, Fisher Spivak, McClelland and Maier

[57] ABSTRACT

A carbonaceous multilayer electrode substrate for a fuel cell disclosed herein has elongated holes for feeding reactant gases to the fuel cell. The electrode substrate comprises at least one porous carbonaceous layer having such holes. An electrode substrate of the invention comprises such a porous layer and a dense layer capable of effecting a function as a separator sheet. An another substrate of the invention comprises a dense layer and two such porous layers on both surfaces of the dense layer. A still another substrate comprises an extended dense layer and two such porous layers on both surfaces of the dense layer.

14 Claims, 7 Drawing Figures

MULTILAYER FUEL CELL ELECTRODE SUBSTRATE HAVING ELONGATED HOLES FOR FEEDING REACTANT GASES

The present invention relates to a fuel cell electrode substrate, more particularly to an electrode substrate which has elongated holes for feeding reactant gases (hydrogen as a fuel gas and oxygen or air) to a fuel cell.

A bipolar fuel cell is known which has a ribbed bipolar separator prepared from an impermeable thin plate of graphite. On the other hand, a ribbed electrode substrate for a monopolar fuel cell has been developed which has a ribbed surface and a flat surface to be in contact with a catalyst layer. Such an electrode substrate is carbonaceous and porous as a whole.

Figure 1:
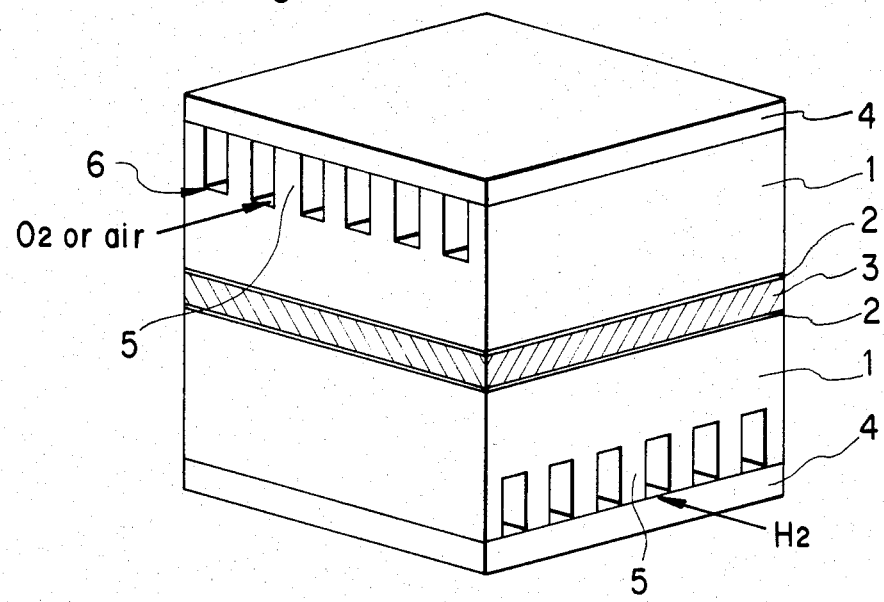

A conventional monopolar fuel cell using such an electrode substrate is illustrated in FIG. 1. A cell is composed of two electrode substrates 1, two catalyst layers 2, a matrix layer 3 impregnated with an electrolyte and two separator sheets 4 to be in contact with ribs 5 of the substrate 1 in a stack of such cells to form a fuel cell. The reactant gases are fed via channels formed by the ribs 5 and the separator sheet 4 and the gases diffuse from the ribbed surface to the flat surface in the porous electrode substrate 1 to reach the catalyst layer 2.

For preparing such an electrode substrate, the following methods previously proposed may be used. For example, one method for preparing a general electrode substrate was proposed in Japanese Patent Application Laying Open No. 166354/82 wherein a mixture based on short carbonaceous fibers is pressed to form a porous shaped article. Another method was described in Japanese Patent Publication No. 18603/78 in which method a machined paper of carbon fibers is impregnated with an organic polymer solution and made into a porous carbon fiber paper. A still another method for preparing an electrode substrate was proposed in U.S. Pat. No. 3,829,327 wherein, a web of carbon fiber is subjected to chemical vapor deposition of carbon to form a porous electrode substrate. All electrode substrates have substantially homogeneous monolayer structures.

Such a homogeneous monolayer electrode substrate has, however, demerits such as follows: with a high bulk density of a substrate, there is obtained only low limiting current density due to less diffusion of the reactant gases and a rapid deterioration of performance of a fuel cell due to insufficient storage of electrolyte in the substrate, and therefore the life of a fuel cell is shortened; on the other hand, demerits are high electric and thermal resistances and a low mechanical strength such as a bending strength, with a low bulk density of an electrode substrate.

Moreover, in the case of an electrode substrate with ribs, the section modulus thereof is reduced due to a ribbed surface, as seen from FIG. 1, and stress is concentrated at the sharp edge portion 6 of ribs 5 resulting in an insufficient mechanical strength of the whole electrode substrate. A thick substrate is, therefore, inevitable in order to obtain a sufficient strength as a shaped substrate, that is, the resistance to diffusion of the reactant gases from the ribbed surface to the flat surface is increased. On the other hand, it is difficult to obtain a complete flatness of the top surface of the ribs and the incomplete flatness of the ribs' top causes significantly large contact electric and thermal resistances between the ribs' top surface and a separator sheet. As generally known such a contact resistance is occasionally several times larger than the conductive resistance in the substrate, and therefore, a conventional monopolar electrode substrate showed lack of uniform distribution of temperature in a cell and reduction of generation efficiency due to the large contact resistance.

It is an object of the present invention to provide an electrode substrate without such demerits.

An another object of the invention is to provide a fuel cell electrode substrate without ribs.

A still another object of the invention is to provide an electrode substrate which has elongated holes for feeding the reactant gases to a fuel cell.

It is an another object of the present invention to provide a fuel cell electrode substrate which has a dense layer and a porous layer, these two layers being integrated.

It is a still another object of the invention is to provide an electrode substrate for a fuel cell which requires no additional separator sheet for stacking the substrates.

A still another object of the invention is to provide a fuel cell electrode substrate which has a dense layer as a separator sheet and two porous layers on both surfaces of the dense layer, these three layers being integrated.

A further object is to provide a fuel cell electrode substrate in which a dense layer as a separator sheet is extended outwardly.

These and other objects will be apparent for those skilled in the art from the following detailed descriptions of the present invention.

An electrode substrate for a fuel cell to be provided by the present invention has a plurality of holes near the center of the thickness of the substrate, these holes being elongated from one side of the substrate to the other side and being parallel to each other and to the electrode surface. These holes provide feeding channels for the reactant gases to a fuel cell. The first embodiment of the substrate of the invention which is carbonaceous as a whole has a dense layer which provides a function as a separator sheet and a porous layer having such holes, these layers being integrated in a body. In the second aspect of the present invention a carbonaceous electrode substrate is provided which has a dense layer as a separator sheet and two porous layers prepared integrally therewith on both surfaces of the dense layer, the porous layer having such holes. In the third aspect of the present invention a carbonaceous electrode substrate comprises an extended dense layer as a separator sheet and two porous layers having such holes prepared integratedly therewith on both surfaces of the extended dense layer.

The "electrode surface" or, in some cases, "surface" herein refers to a surface of a fuel cell, an electrode substrate or a component layer thereof which is parallel to the surface of the catalyst layer (2 in FIG. 1) to be contacted with a substrate or a matrix layer (3 in FIG. 1). The "side" or, occasionally, "side surface" herein refers to a surface of a fuel cell, an electrode substrate or a component layer thereof which is perpendicular to said "electrode surface".

Figure 2:
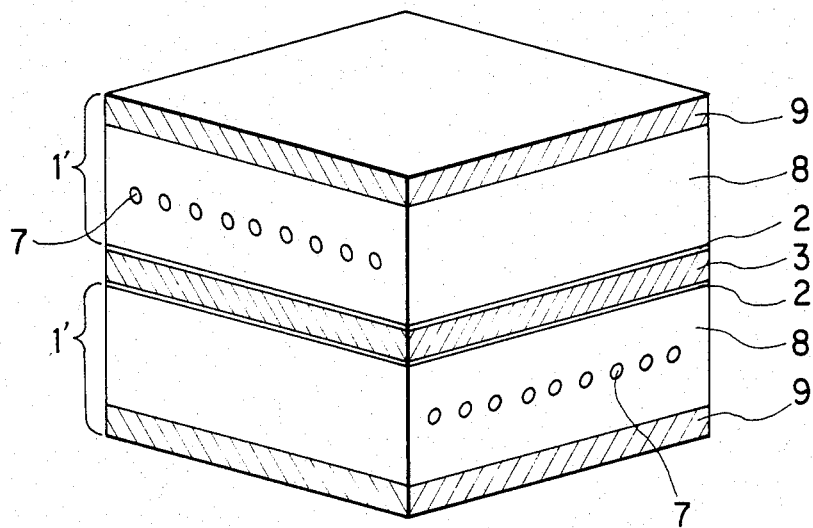
Figure 3:
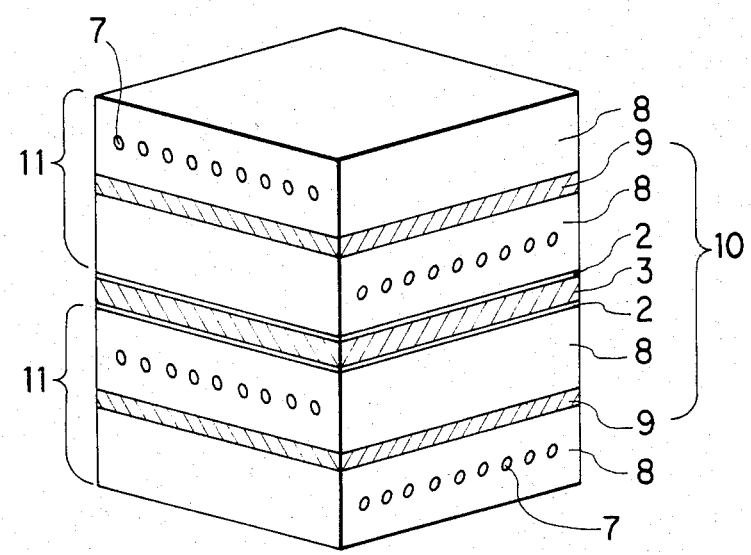
Figure 4:
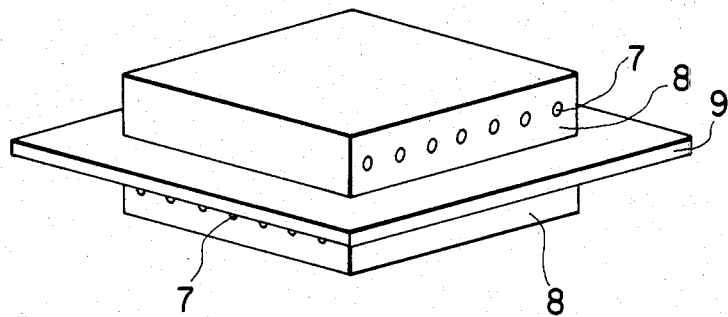
Figure 5:
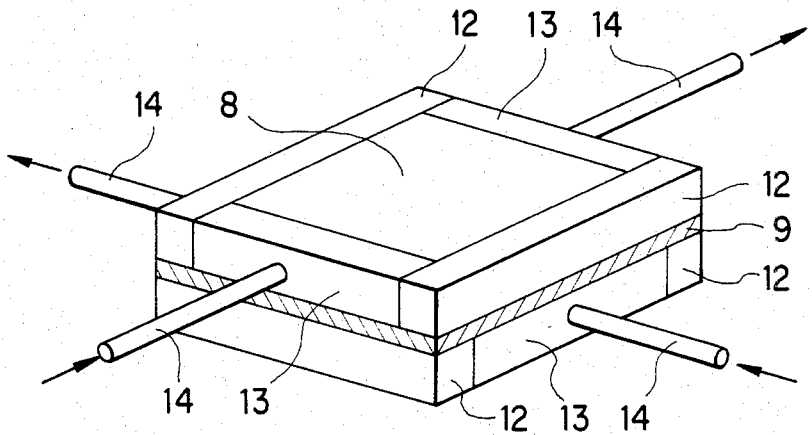
Figure 6:
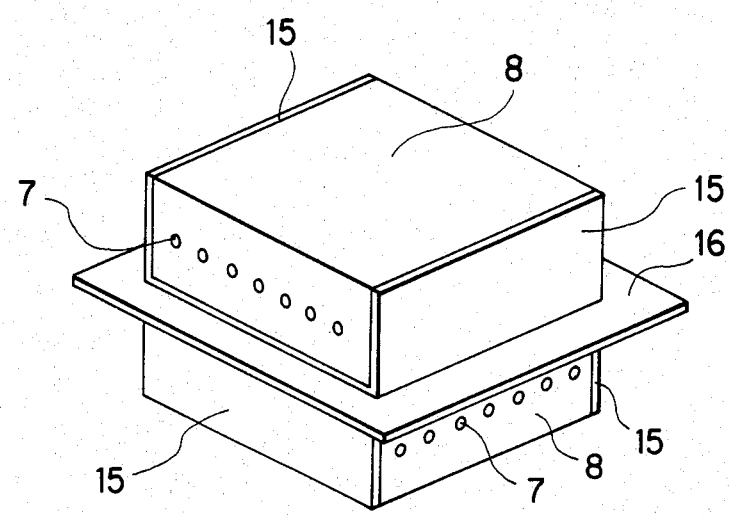
Figure 7:
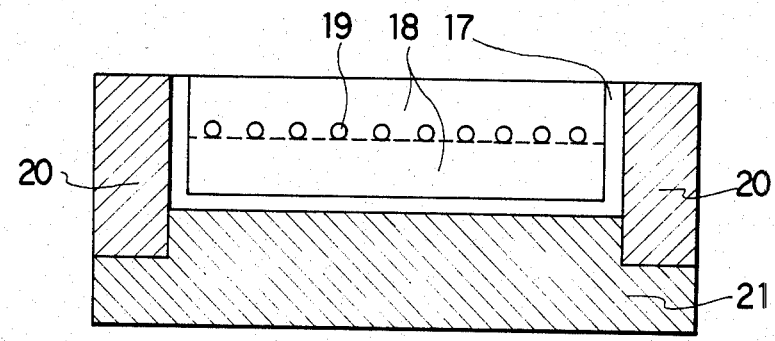

The present invention will be illustrated in more detail while referring to the attached drawings. Among the drawings, FIG. 1 shows the cell structure of a fuel cell with ribbed monopolar electrode substrates according to the prior art, FIG. 2 shows the cell structure of a fuel cell according to the first embodiment of the present invention, FIG. 3 shows the cell structure of a fuel cell according to the second embodiment of the present invention, FIG. 4 shows the structure of the electrode substrate of the third embodiment of the present invention, FIG. 5 shows how to use the electrode substrate of the invention according to the third embodiment, FIG. 6 shows an another electrode substrate of the third embodiment of the present invention and FIG. 7 is an explanatory view of the preparation of the electrode substrate of FIG. 6. In the drawings, the part represented by the same numeral is directed to the part corresponding to each other.

FIG. 2 is an explanatory view of the first embodiment of the electrode substrate of the invention. The electrode substrate 1' of the present invention comprises a porous layer 8 having holes 7 and a dense layer 9. As shown in FIG. 2, the elongated holes 7 for feeding reactant gases to a fuel cell are provided near the center of the thickness of the porous layer 8. These holes 7 are parallel to each other and to the electrode surface and continuously elongated from one side of the porous layer 8 to the opposite side of the porous layer 8. Although the cross section of the holes 7 may be circular as shown in FIG. 2, any form of the cross section of the holes 7 may be utilizable in the present invention. The cross section of the hole 7 is preferably about 0.2–7 $mm^2$, this cross section corresponding to a diameter of 0.5–3 mm in the typical case of circular cross section. With smaller size the resistance to diffusion of reactant gases becomes too high. On the other hand, the thickness of the substrate should be too large resulting in reduction of the volume efficiency of a fuel cell in a stack with larger size.

The porous layer 8 comprises uniformly porous and carbonaceous material. The porous layer 8 has an average bulk density of 0.3–1.0 $g/cm^3$, preferably 0.4–0.8 $g/cm^3$ and a specific gas permeability to the reactant gases of not less than 20 ml/cm.hr.mmAq. Furthermore, the pores of the porous layer 8 are open pores and preferably, not less than 60% of the pores have a diameter in the range of 10–100$\mu$.

The dense layer 9 preferably has an average bulk density of not less than 1.0 $g/cm^3$ and a specific gas permeability of not more than 0.2 ml/cm.hr.mmAq. in order to be able to effect a function as a separator sheet (4 in FIG. 1). The thickness of the dense layer 9 is preferably not more than a half of the total thickness of the electrode substrate 1' in the invention. The electrode substrate having such a bulk density and a specific gas permeability is preferable for a fuel cell in view of a mechanical strength such as a bending strength and a resistance to diffusion of reactant gases.

The electrode substrate may be prepared as follows, for example, in the first embodiment of the present invention.

10–50% by weight of a filler such as short carbon fiber and granular active carbon, 10–40% by weight of a binder such as phenol resin, epoxy resin and petroleum and/or coal pitch and 20–50% by weight of a pore regulator such as polyvinyl alcohol, polyethylene, polypropylene, polyvinyl chloride and sugar are blended to be a homogeneous mixture. The mixed amount of the components is an only example and not limited in the above-mentioned ranges. Such a mixture may also be used as a raw material for a porous layer in the other embodiments of the present invention, as hereinafter described.

The mixture is then fed into a die having a proper configuration. On the introduced mixture a polymer material in the form of cloth (or textile) or reed screenlike sheet (or lattice) for forming elongated holes such as polyethylene, polypropylene, polystyrene, polyvinyl alcohol and polyvinyl chloride is supplied and thereafter the same mixture as above-mentioned is again fed.

And then finally a raw material for the dense layer are supplied into the die.

The raw material for the dense layer 9 is one selected from a graphite plate, a graphite sheet, a carbon plate and a powdery mixture comprising short carbon fiber, fine powder of carbon precursor (see Japanese Patent Publication No. 31116/80), phenol resin and granular active carbon. A graphite sheet is most preferred for a material of the dense layer in the present invention.

Pressing is then carried out at a temperature of the die of 70°–200° C. under a pressure of 5–100 $kg/cm^2$ for 1–60 minutes. The pressing conditions may be selected according to the object from the wider range than above-mentioned. The shaped product is precured at about 800° C. for about one hour. Then after only dense layer of the cured product is impregnated with liquid phenol resin (using alcohol or the like as a solvent into which the phenol resin can be dissolved), the product is again cured at about 800° C. for about one hour. This impregnation and cure steps are repeated several times to obtain the desired density of the dense layer. Finally, the cured product with the desired density is postcured at 120°–170° C. under a pressure of not more than 5 $kg/cm^2$ for at least two hours and then calcined at 1000°–3000° C. for about one hour in an inert atmosphere. In the heating procedure, a slow increase of temperature upto about 700° C. is preferable in order to prevent generation of stress due to sudden shrinkage on thermal decomposition at low temperature. Such stress would cause exfoliation of layers and/or crack.

In the second embodiment of the present invention, the electrode substrate may have a dense layer and two porous layers on both surfaces of the dense layer, these three layers being prepared integrally in a body.

In FIG. 3 is shown a stack of cells using the electrode substrate of the second embodiment of the invention wherein the numeral 10 represents a cell structure corresponding to the structure shown in FIG. 1 or 2. The electrode substrate 11 of the invention has a dense layer 9 and two porous layers 8 having holes 7 as mentioned above. The holes 7 in the porous layer 8 are designed so as to have a direction vertical to the direction of the holes 7 in an adjacent porous layer 8, as shown in FIG. 3.

The porous layer 8 and the dense layer 9 have the same structure and physical properties as mentioned above on the second embodiment of the invention. The dense layer 9 preferably has a thickness of 0.1–3.0 mm.

The electrode substrate 11 of the second embodiment of the invention may be prepared from the same materials in a similar manner as the first embodiment of the invention (refer to Examples 4–6).

The electrode substrate of the present invention does not have ribbed surface to be in contact with the separator sheet in a stack to form a fuel cell as in a conventional substrate but flat surfaces on both electrode surfaces, therefore the substrate has a larger section modulus and a more improved mechanical strength such as a bending strength than a conventional ribbed electrode substrate. Furthermore, the bending strength may be more improved since the holes 7 are provided near the center of the thickness of the porous layer 8 as shown in FIGS. 2 and 3. There are further advantages of the invention, that is, a thinner substrate may be obtained resulting in a shorter diffusion path or a lower resistance to diffusion of reactant gases and a larger current density. The cost for preparing the electrode substrate of the invention may be markedly reduced compared with a conventional substrate for a fuel cell, for example a ribbed electrode substrate 1 as shown in FIG. 1. Thus the electrode substrate of the present invention is well suitable for a fuel cell.

In the electrode substrate of the invention, the dense layer can effect a function as a separator sheet and therefore any separator sheet is not required in a stack to form a fuel cell. As a result, no contact resistance between a separator sheet and an electrode substrate of the invention is occurred. Furthermore, since the dense layer as a separator sheet and two porous layers are integrated in a body in the second embodiment of the invention, there is no contact resistance between the dense layer (separator sheet) and the porous layer in a stack to form a fuel cell. No requirement of any separator sheet enables low cost.

The advantages of the invention will be more apparent from the following Table 1 showing the physical properties of the electrode substrates of the invention and the prior art (FIG. 1) for comparison.

TABLE 1

|  | prior art | present invention | |
|---|---|---|---|
|  |  | first embodiment | second embodiment |
| thickness of substrate (mm) | 2.4 | 2.0 | 3.6[1] |
| thickness of a cell (mm) | 5.8[2] | 4.5[3] | 4.1[4] |
| bending strength (kg/cm$^2$) | 100 | 250 | 250 |
| compressive strength (kg/cm$^2$) | 100 | 150 | 150 |
| electric[5] resistance (mΩ) substrate | 8 | 6 | 10 |
| contact resistance[6] | 30 | 20 | — |
| total of a cell | 77[7] | 32[8] | 10 |
| thickness for gas diffusion (mm) | 1.2 | 1.0 | 1.0 |
| limiting current (mA/cm$^2$) | 400 | 500 | 500 |
| volumetric power (KW/m$^3$)[9] | 207 | 267 | 298 |

Note:
[1] one dense layer (0.6 mm) + two porous layers (each 1.5 mm)
[2] separator sheet (0.5 mm) + two substrates + matrix layer (0.5 mm)
[3] two substrates + matrix layer (0.5 mm)
[4] substrate + matrix layer (0.5 mm)
[5] resistance per 1 cm$^2$
[6] resistance measured at contact pressure of 1 kg/cm$^2$
[7] separator sheet (1 mΩ) + two substrates + two contact resistances
[8] two substrates + contact resistance
[9] measured at 200 mA/cm$^2$ The electrode substrate of the present invention is suitably used for a monopolar fuel cell by stacking as shown in FIGS. 2 and 3. In the use of the fuel cell, however, the reactant gases may also diffuse out from the sides of the porous layers of the electrode substrates on both surfaces of the separator sheet (the dense layer of the invention) in the fuel cell, causing danger of mixing the reactant gases.

In the third embodiment of the present invention, the dense layer is extended outwardly from the sides of the fuel cell substrate in order to prevent such danger of mixing of the reactant gases. FIG. 4 shows the structure of the electrode substrate provided by the third embodiment of the invention. The substrate comprises an extended dense layer 9 and two porous layers 8 on both surfaces of the dense layer 9, each porous layer having holes 7 as mentioned above. The dense layer 9 is preferably a graphite sheet. The physical properties of the porous layers 8 and the dense layer 9 are the same as mentioned above on the first and second embodiments.

The electrode substrate of the third embodiment of the present invention may be prepared from the same raw materials as the above-mentioned embodiments. In the preparation of the substrate, after pressing in a die the mixture for a porous layer, the material for holes, the mixture for a porous layer and a material for a dense layer supplied in the order into the die, the shaped product is once removed from the die and into the same die the mixture for a porous layer, the material for holes and the mixture for a porous layer are supplied in this order. The previously shaped product is placed on the supplied materials so that the dense layer be in contact with the supplied material and pressed. Other treatments are the same as in the precedent embodiments.

The electrode of the third embodiment of the invention effectively prevents the mixing of the reactant gases diffused out of the sides of the fuel cell since the dense layer 9 is extended outwardly from the side surface of the porous substrate. Therefore, the fuel cell according to the third embodiment of the present invention can be efficiently operated without danger.

FIG. 5 shows the partial construction of a fuel cell using the electrode substrate according to the third embodiment of the present invention in a stack. In the fuel cell, peripheral sealers 12 are combined by an appropriate means on the sides of the porous layer 8, which sides are parallel to the holes 7, and gas manifolds 13 provided with a tube 14 for introducing reactant gases into the holes are disposed on the other sides of the porous layers 8, as shown in FIG. 5. In FIG. 5 arrows represent the directions of flow of the reactant gases. The peripheral sealer 12 is made of a material having a good electrical insulation, a thermal resistance at about 200° C. on operation of the fuel cell and a good resistance to corrosion of 100% phosphoric acid, for example Teflon, silicon carbide or ceramics or a suitable material coated with Teflon or silicon carbide.

In order to more effectively prevent the diffusion of the reactant gases from the sides, parallel to the holes 7, of the porous layers 8, a graphite sheet 15 for sealing the side of the porous layer 8 to be in contact with the peripheral sealer 12 may be used as shown in FIG. 6. The graphite sheet 15 is made of a material having the same properties as the dense layer 9. Although the graphite sheet 15 may cover only the side to be contacted with the peripheral sealer 12, it is preferable to be integrated with the dense layer 9 (preferably a graphite sheet 16). In this case the graphite sheet 15 has preferably a U-shaped cross section and is combined with the graphite sheet 16 as shown in FIG. 6. The graphite sheet 15 for sealing the side of the porous layer 8 may be extended outwardly from the side vertical to the holes to the end of the graphite sheet 16.

Such an electrode substrate according to the third embodiment of the present invention may be prepared in a similar manner to that mentioned above on this embodiment and will be illustrated in Example 8.

The present invention will be illustrated while referring to the following non-limiting Examples. It will be understood that various modifications may be carried out by those skilled in the art without difficulty and such variations will be included in the present invention.

In the examples, the "porosity P (%)" was determined by the following equation while assuming that the real density of a carbonaceous substrate was 1.6 g/cm$^3$;

$$P = (1 - \rho_b/1.6) \times 100$$

wherein $\rho_b$ was the measured bulk density (g/cm$^3$) of a specimen, the "bending strength (kg/cm$^2$)" of a porous carbonaceous shaped article was determined according to Japanese Industrial Standards (JIS) K-6911/1970 while using a specimen with a dimension of $100 \times 10 \times 2.5$ mm, and the "average pore diameter ($\mu$m)" of a specimen was measured by a mercury porosimeter (manufactured by Carlo Erba Strumentazione, Italia). The "specific gas permeability $Q_s$ (ml/cm.hr.mmAq.)" was determined in the following manner: a cylindrical specimen of 90 mm in diameter and t mm in thickness was cut out from a substrate to be measured, the circumferential side surface of the specimen was treated with a thermosetting resin so that gas might not permeate therethrough, both longitudinal end surfaces of the specimen were then put between two cylindrical gas tubes with frange holding a gasket, a predetermined amount (10 l/min) of air was supplied from one end of the specimen to the other end thereof which was open to the atmosphere, the pressure loss between two ends of the specimen was measured by a manometer attached to the upstream of the gas tube and the specific gas permeability $Q_s$ was then calculated by the following equation;

$$Q_s = \frac{6 \times t \times 10^4}{50.24 \times \Delta p}$$

wherein $\Delta p$ was the measured pressure loss (mmAq.) and 50.24 cm$^2$ was a real area to be measured (a circle of 80 mm in diameter). Further, the "volume resistivity $\rho_V$ ($\Omega$cm)" was determined in the following manner: both ends of a specimen were coated with an electroconductive coating material and an electrical resistance between two ends of the specimen was measured according to SRIS (Standards of Japan Rubber Association) 2301-1969, and then the volume resistivity was calculated by the following equation;

$$\rho_V = R \cdot w \cdot t / l$$

wherein R was the measured resistance ($\Omega$) between the ends of the specimen, 1 (cm) was a longitudinal length (direction to be measured), and w (cm) and t (cm) were a horizontal and a vertical lengths, respectively, defining a cross section of the specimen.

EXAMPLE 1

A homogeneous mixture for a porous layer was prepared by blending 40% by weight of short carbon fiber with an average fiber length of 0.45 mm and an average fiber diamer of 12 $\mu$m (manufactured by Kureha Chemical Industry Co., Ltd. M104S), 30% by weight of granular polyvinyl alcohol with an average particle diameter of 180 $\mu$m (manufactured by the Nippon Synthetic Chemical Industry Co., Ltd.) as a pore regulator and 30% by weight of phenol resin (manufactured by Asahi Organic Material K.K.) as a binder.

The mixture was supplied into a die for press molding. On the supplied mixture a shaped reed-like polyvinyl alcohol as a material for forming elongated holes was placed, and then the homogeneous mixture was again supplied on the material for holes.

A homogeneous mixture for a dense layer prepared by blending 20% by weight of short carbon fiber (same as above), 20% by weight of fine granule of active carbon with an average diameter of 300 $\mu$m (manufactured by Kureha Chemical Industry Co., Ltd.), 40% of fine powder of carbon precursor with an average diameter of 40 $\mu$m (manufactured by Kureha Chemical Industry Co., Ltd., M.H.) and 20% by weight of the phenol resin (same as above) was supplied into the die onto the mixture for a porous layer.

The supplied materials were pressed at 140° C. and 50 kg/cm$^2$ for about 30 minutes and cured at 800° C. for about one hour. Then the surface of the dense layer of the cured product was impregnated with a solution of phenol resin in ethylalcohol. After drying the product was again cured at 800° C. for about one hour. The impregnation and cure steps were repeated three times, thereafter the substrate was calcinated at 2000° C. for one hour.

The obtained substrate of 300 mm in length and 300 mm in width had a porous layer having holes of which cross section is approximately circular with diameter of about 0.8 mm, a distance between two adjacent holes being 5 mm, and a dense layer which was found to be usable as a separator sheet.

The substrate had the physical properties shown in the following Table 2.

TABLE 2

|  | dense layer | porous layer |
| --- | --- | --- |
| thickness (mm) | 0.5 | 1.5 |
| bulk density (g/cm$^3$)[1] | 1.47 | 0.58 |
| porosity (%)[1] | 9 | 64 |
| specific gas permeability (ml/cm.hr.mmAq.) | 0.02 | 100 |
| average pore diameter ($\mu$)[1] | — | 30 |
| bending strength (kg/cm$^2$) | 240 | |
| volume resistivity ($\Omega$cm) | 16 $\times$ 10$^{-3}$ | |

Note:
[1]exclusive of holes

EXAMPLE 2

A graphite plate with a thickness of 1.0 mm was used for a material for forming a dense layer. An electrode substrate having a dense layer and a porous layer with holes was prepared in a similar manner as Example 1. The holes had an approximately circular cross section of about 0.8 mm in diameter.

The substrate had the physical properties shown in Table 3.

TABLE 3

|  | dense layer | porous layer |
| --- | --- | --- |
| thickness (mm) | 1.0 | 1.5 |
| bulk density (g/cm$^3$)[1] | 1.8 | 0.58 |
| porosity (%)[1] | $\leq$1.0 | 64 |
| specific gas permeability (ml/cm.hr.mmAq.) | $\leq$0.01 | 110 |
| average pore diameter ($\mu$)[1] | — | 30 |
| bending strength (kg/cm$^2$) | 280 | |
| volume resistivity ($\Omega$cm) | 14 $\times$ 10$^{-3}$ | |

Note:
[1]exclusive of holes

EXAMPLE 3

Using a graphite sheet with a thickness of 0.3 mm (manufactured by UCC, GRAFOIL) instead of the material for a dense layer in Example 1, an electrode substrate was prepared in a similar manner to Example 1.

The obtained substrate had a porous layer having holes with an approximately circular cross section of about 0.8 mm in diameter and the physical properties shown in Table 4.

TABLE 4

|  | dense layer | porous layer |
| --- | --- | --- |
| thickness (mm) | 0.3 | 1.5 |
| bulk density (g/cm$^3$)[1] | 1.12 | 0.58 |
| porosity (%)[1] | — | 64 |
| specific gas permeability (ml/cm.hr.mmAq.) | ≦0.01 | 115 |
| average pore diameter ($\mu$)[1] | — | 30 |
| bending strength (kg/cm$^2$) | 280 | |
| volume resistivity (Ωcm) | 14 × 10$^{-3}$ | |

Note:
[1] exclusive of holes

EXAMPLE 4

The same mixture for a porous layer as Example 1, the same material for holes as Example 1 and the mixture for a porous layer were supplied in this order into a die for press molding. Subsequently, a carbon plate of 0.6 mm in thickness (manufactured by Toyo Carbon Co., Ltd.) as a material for a dense layer was supplied on the mixture. On the carbon plate were again supplied the mixture for a porous layer, the material for holes and the mixture for a porous layer, in this order.

The materials were pressed at 140° C. and 40 kg/cm$^2$ for 20 minutes. After postcuring the shaped product at 130° C. for two hours, the temperature was gradually increased to 700° C. at a rate of 100° C. per hour and then the shaped product was calcinated at 2000° C. for one hour.

The electrode substrate obtained had the structure as represented by numeral 11 in FIG. 3, and the porous layer had holes with an approximately circular cross section of about 0.8 mm in diameter. The substrate had the physical properties shown in Table 5.

TABLE 5

|  | dense layer | porous layer |
| --- | --- | --- |
| thickness (mm) | 0.6 | 1.5[2] |
| bulk density (g/cm$^3$)[1] | 1.47 | 0.58 |
| porosity (%)[1] | 9 | 64 |
| specific gas permeability (ml/cm.hr.mmAq.) | 0.02 | 110 |
| average pore diameter ($\mu$)[1] | — | 30 |
| bending strength (kg/cm$^2$) | 250 | |
| volume resistivity (Ωcm) | 10 × 10$^{-3}$ | |

Note:
[1] exclusive of holes
[2] one layer represented by 8 in FIG. 3

EXAMPLE 5

By using a mixture for a dense layer (same as Example (1) instead of the carbon plate used in Example 4, an electrode substrate was prepared in a similar manner as Example 4.

The obtained substrate had the physical properties shown in Table 6.

TABLE 6

|  | dense layer | porous layer |
| --- | --- | --- |
| thickness (mm) | 0.6 | 1.5[2] |
| bulk density (g/cm$^3$)[1] | 1.47 | 0.58 |
| porosity (%)[1] | 9 | 64 |
| specific gas permeability (ml/cm.hr.mmAq.) | 0.02 | 110 |
| average pore diameter ($\mu$)[1] | — | 30 |
| bending strength (kg/cm$^2$) | 240 | |
| volume resistivity (Ωcm) | 10 × 10$^{-3}$ | |

Note:
[1] exclusive of holes
[2] one layer represented by 8 in FIG. 3

EXAMPLE 6

The same procedure as Example 4 was carried out except using a graphite sheet of 0.3 mm in thickness (same as Example 3) for a dense layer.

The resultant electrode substrate had holes with an approximately circular cross section of about 0.8 mm in diameter in porous layer. The physical properties of the substrate are shown in Table 7.

TABLE 7

|  | dense layer | porous layer |
| --- | --- | --- |
| thickness (mm) | 0.3 | 1.5[2] |
| bulk density (g/cm$^3$)[1] | 1.12 | 0.58 |
| porosity (%)[1] | — | 64 |
| specific gas permeability (ml/cm.hr.mmAq.) | 0.01 | 115 |
| average pore diameter ($\mu$)[1] | — | 30 |
| bending strength (kg/cm$^2$) | 280 | |
| volume resistivity (Ωcm) | 14 × 10$^{-3}$ | |

Note:
[1] exclusive of holes
[2] one layer represented by 8 in FIG. 3

EXAMPLE 7

The same mixture for a porous layer as Example 1, the same material for holes as Example 1 and the mixture for a porous layer were supplied in this order into a die for press molding. A graphite sheet of 0.6 mm in thickness having a size larger by about 50 mm in total (25 mm in one side) than inner size of the die was placed on the mixture. The materials were pressed at 140° C. and 40 kg/cm$^2$ for 20 minutes.

After pressing, the shaped product was removed from the die and into the same die were supplied the mixture for a porous layer, the material for holes and the mixture for a porous layer, in this order.

The shaped product obtained above was placed so that the graphite sheet was faced on the newly supplied materials and the whole materials were pressed at 140° C. and 40 kg/cm$^2$ for 20 minutes. After postcuring at 130° C. for about two hours, the temperature was increased gradually at a rate of 100° C. per hour up to 700° C. and then calcination was carried out at 2000° C. for one hour.

The obtained electrode substrate had a structure as shown in FIG. 4 and holes in the porous layer had an approximately circular cross section with a diameter of about 0.8 mm. The physical properties are shown in Table 8.

TABLE 8

|  | dense layer | porous layer |
| --- | --- | --- |
| thickness (mm) | 0.6 | 1.5[2] |
| bulk density (g/cm$^3$)[1] | 1.12 | 0.58 |
| porosity (%)[1] | — | 64 |
| specific gas permeability (ml/cm.hr. mmAq.) | 0.02 | 110 |
| average pore diameter ($\mu$)[1] | — | 30 |
| bending strength (kg/cm$^2$) | 180 | |

TABLE 8-continued

|  | dense layer | porous layer |
|---|---|---|
| volume resistivity (Ωcm) |  | $10 \times 10^{-3}$ |

Note:
[1] exclusive of holes
[2] one layer represented by 8 in FIG. 4

EXAMPLE 8

This Example shows the procedure of preparation of the electrode substrate shown in FIG. 6 while referring to FIG. 7.

A graphite sheet 17 with a thickness of 0.3 mm was placed in a die for press molding (represented by 20 and 21) as shown in FIG. 7. A mixture 18 for a porous layer 8, a material 19 for holes 7 and the mixture 18 for a porous layer 8 were supplied on the graphite sheet 17, materials being the same as Example 7, respectively.

The materials were pressed at 140° C. and 40 kg/cm² for 20 minutes.

An another shaped product was prepared in the same manner as mentioned above. After coating a carbon adhesive of phenol resin on the graphite sheet 15 (in FIG. 6) of the obtained shaped products, two shaped products were sticked together with a graphite sheet 16 of 0.3 mm in thickness (GRAFOIL) interposed therebetween, the graphite sheet 16 having the size larger by 50 mm in total (25 mm in one side) than the outer size of the shaped products, so that each direction of holes in each porous layer 8 on both sides of the graphite sheet 16 is vertical to each other.

The resultant substrate was postcured at 130° C. for about two hours, and after increasing temperature gradually at a rate of 100° C. per hour up to 700° C. the substrate was calcinated at 2000° C. for one hour.

The obtained electrode substrate had a structure shown in FIG. 6 and holes 7 in the porous layer 8 had an approximately circular cross section with a diameter of about 0.8 mm.

The physical properties of the substrate are shown in Table 9.

TABLE 9

|  | dense layer[2] | porous layer |
|---|---|---|
| thickness (mm) | 1.1 | 1.5[3] |
| bulk density (g/cm³)[1] | 1.10 | 0.58 |
| porosity (%)[1] | — | 64 |
| specific gas permeability (ml/cm.hr.mmAq.) | 0.02 | 110 |
| average pore diameter (μ)[1] | — | 30 |
| bending strength (kg/cm²) |  | 200 |
| volume resistivity (Ωcm) |  | $10 \times 10^{-3}$ |

Note:
[1] exclusive of holes
[2] two graphite sheets 15 + graphite sheet 16
[3] one layer represented by 8 in FIG. 6

What is claimed is:

1. A carbonaceous electrode substrate for a fuel cell, comprising:

a dense layer having an average bulk density of not less than 1.0 g/cm³ and a specific gas permeability of not more than 0.2 ml/cm. hr. mmAq;

a porous layer of a uniformly porous carbonaceous material having an average bulk density of not less than 1.0 g/cm³ and a specific gas permeability; of 0.3-1.0 g/cm³ and a specific gas permeability of not less than 20 ml/cm. hr. mmAq;

the thickness of said dense layer being not more than half of the thickness of said electrode substrate;

a plurality of holes extending between two parallel sides of said porous layer and parallel to the surface of said electrode substrate, said holes being provided near the center of the thickness direction of said porous layer and having a circular cross section.

2. The substrate of claim 1, in which the hole has a diameter of b 0.5-3.0 mm.

3. The substrate of claim 1 or 2, in which not less than 60% of pores in the porous layer have a diameter of 10-100μ.

4. The substrate of claim 1 or 2, in which the dense layer is a graphite sheet.

5. A carbonaceous electrode substrate for a fuel cell, comprising:

a dense layer;

two porous layers of a uniformly porous carbonaceous material, each porous layer being provided on opposite surfaces of said dense layer, the thickness of said dense layer being not more than half of the thickness of said electrode substrate, and a plurality of holes in each of said porous layers extending between two parallel sides of said layer and parallel to the surface of said electrode substrate, said holes being provided near the center of the thickness direction of said porous layer having a circular cross-section, the holes in one of said layers extending in a direction perpendicular to the direction of the holes of the other of said layer.

6. The substrate of claim 5, in which the bole has a diameter of 0.5-3.0 mm.

7. The substrate of claim 5 or 6, in which not less than 60% of pores in the porous layer have a diameter of 10-100μ.

8. The substrate of claim 5 or 6, in which the thickness of the dense layer is preferably 0.1-3.0 mm.

9. The substrate of claim 5 or 6, in which the dense layer is a graphite sheet.

10. A fuel cell according to claim 5 wherein said dense layer extends beyond said porous layers.

11. The substrate of claim 10, which further comprises an another dense sheet for sealing the side of the porous layer parallel to the holes.

12. The substrate of claim 11, in which the another dense sheet is a graphite sheet having U-shaped cross section.

13. The substrate of claim 11 or 12, in which the another dense sheet is attached to the dense layer.

14. The substrate of claim 11 or 12, further comprising a peripheral sealer on the side of the pourous layer parallel to the holes on a gas manifold on the side of the porous layer perpendicular to the holes.

* * * * *

UNITED STATES PATENT AND TRADEMARK OFFICE
CERTIFICATE OF CORRECTION

PATENT NO. : 4,522,895
DATED : JUNE 11, 1985
INVENTOR(S) : MASATOMO SHIGETA ET AL.

It is certified that error appears in the above-identified patent and that said Letters Patent is hereby corrected as shown below:

In column 12, lines 5-6, delete "of not less than $1.0 g/cm^3$ and a specific gas permeability;--.

Signed and Sealed this

Twenty-seventh Day of May 1986

[SEAL]

Attest:

DONALD J. QUIGG

Attesting Officer

Commissioner of Patents and Trademarks